(12) United States Patent
Huijs et al.

(10) Patent No.: US 8,318,851 B2
(45) Date of Patent: Nov. 27, 2012

(54) WEATHERABLE RESINOUS COMPOSITIONS

(75) Inventors: Franciscus Maria Huijs, Breda (NL); Robert Dirk van de Grampel, Tholen (NL); Ronald Akkermans, Steenbergen (NL)

(73) Assignee: Sabic Innovative Plastics IP B.V. (NL)

( * ) Notice: Subject to any disclaimer, the term of this patent is extended or adjusted under 35 U.S.C. 154(b) by 7 days.

(21) Appl. No.: 11/873,084

(22) Filed: Oct. 16, 2007

(65) Prior Publication Data

US 2009/0099297 A1 Apr. 16, 2009

(51) Int. Cl.
*C08L 51/00* (2006.01)

(52) U.S. Cl. ............ 524/504; 524/500; 525/64; 525/68

(58) Field of Classification Search .................. 524/500, 524/504, 505; 525/64, 67, 68
See application file for complete search history.

(56) References Cited

U.S. PATENT DOCUMENTS

| | | |
|---|---|---|
| 3,711,575 A | 1/1973 | Kakefuda et al. |
| 3,944,631 A | 3/1976 | Yu et al. |
| 4,217,438 A | 8/1980 | Brunelle et al. |
| 4,731,414 A | 3/1988 | Ting |
| 4,831,079 A | 5/1989 | Ting |
| 6,204,313 B1 | 3/2001 | Bastiaens et al. |
| 6,306,507 B1 | 10/2001 | Brunelle et al. |
| 6,559,270 B1 | 5/2003 | Siclovan et al. |
| 6,583,256 B2 | 6/2003 | Vollenberg et al. |
| 7,049,368 B2 | 5/2006 | Berzinis et al. |
| 7,357,988 B2 * | 4/2008 | Howie .......................... 428/500 |
| 2001/0016626 A1 | 8/2001 | Vollenberg et al. |
| 2003/0216539 A1 | 11/2003 | Siclovan et al. |
| 2006/0069208 A1 * | 3/2006 | Dhawan et al. ................ 525/191 |
| 2007/0129482 A1 * | 6/2007 | Kuvshinnikova et al. .... 524/500 |
| 2008/0242779 A1 * | 10/2008 | Gaggar et al. ................ 524/261 |

FOREIGN PATENT DOCUMENTS

WO 0026275 5/2000

OTHER PUBLICATIONS

International Search Report; International Application No. PCT/IB2008/054222; International Filing Date: Oct. 14, 2008; Earliest Priority Date: Oct. 16, 2007; 3 Pages.
Written Opinion of the International Searching Authority; International Application No. PCT/IB2008/054222; International Filing Date: Oct. 14, 2008; Earliest Priority Date: Oct. 16, 2007; 6 Pages.

* cited by examiner

*Primary Examiner* — David W Wu
*Assistant Examiner* — Marie Reddick
(74) *Attorney, Agent, or Firm* — Cantor Colburn LLP

(57) ABSTRACT

Disclosed are compositions comprising: (i) 5-45 wt. % of an acrylonitrile-styrene-acrylate (ASA) graft copolymer or acrylate-modified ASA, (ii) 2-82 wt. % of at least one polyestercarbonate which is a block polyestercarbonate comprising organic carbonate blocks alternating with arylate blocks, said arylate blocks comprising ester structural units derived from at least one 1,3-dihydroxybenzene moiety and at least one aromatic dicarboxylic acid, and having a degree of polymerization of at least about 4; and (iii) 5-60 wt. % of at least one rigid thermoplastic polymer comprising structural units derived from styrene and acrylonitrile; alpha-methylstyrene and acrylonitrile; alpha-methylstyrene, styrene, and acrylonitrile; styrene, acrylonitrile, and methyl methacrylate; alpha-methyl styrene, acrylonitrile, and methyl methacrylate; or alpha-methylstyrene, styrene, acrylonitrile, and methyl methacrylate, or mixtures thereof, wherein wt. % values are based on the weight of components (i)-(iii) and wherein a molded article made from the composition has a notched Izod impact strength of at least 5 kilojoules per square meter (kJ/m$^2$) as determined according to ISO 180 at room temperature and a Vicat B value of at least 101° C. determined at 120° C. according to ISO 306. Articles made from said compositions are also disclosed.

16 Claims, No Drawings

WEATHERABLE RESINOUS COMPOSITIONS

BACKGROUND

The present invention relates to weatherable acrylonitrile-styrene-acrylate (ASA) graft copolymer compositions having a beneficial combination of impact strength and heat properties. In particular embodiments the invention relates to ASA compositions comprising a polyestercarbonate resin.

ASA resin typically has excellent weatherability and processability properties. When it is desired to make ASA formulations with higher heat properties, blends are usually prepared comprising ASA and α-methylstyrene-acrylonitrile copolymer (AMSAN) or ASA and maleimide-containing polymers. However, the maximum obtainable heat properties in such blends are rather low due to the low maximum glass transition temperature (Tg) of the materials, typically about 120° C. Furthermore, maleimide-containing polymers may have toxic properties and therefore are not suitable for many commercially applications. Better heat properties can be obtained in ASA blends with polycarbonate (PC), which latter polymer has a Tg of about 145° C. However, it is known that the addition of polycarbonate to ASA formulations can reduce the impact strength in molded articles comprising such compositions. In addition, the discoloration of these ASA-PC formulations upon weathering is usually severe due to the limited weatherability of polycarbonate. Hence, there is a continued need for ASA blends that possess an attractive balance of thermal and physical properties while retaining weatherability in molded articles.

ASA is taught as an impact modifier in compositions containing polyestercarbonate in U.S. Pat. No. 6,583,256. However, exemplary compositions also require the presence of a poly(alkylene dicarboxylate) which renders the compositions unsuitable for some applications. In particular the use of poly(alkylene dicarboxylate)s such as poly(butylene terephthalate) typically results in a composition with low impact strength and less than optimal weathering properties.

BRIEF DESCRIPTION

The present invention relates to a composition comprising an ASA resin and a polyestercarbonate, which surprisingly shows no decrease in impact strength over a range of polyestercarbonate levels in contrast to compositions wherein a comparable amount of polycarbonate replaces the polyestercarbonate. The composition of matter posses an attractive balance of other physical, weathering and thermal properties. Thus, in one embodiment the present invention comprises a composition comprising (i) 5-45 wt. % of an acrylonitrile-styrene-acrylate (ASA) graft copolymer or acrylate-modified ASA, (ii) 2-82 wt. % of at least one polyestercarbonate which is a block polyestercarbonate comprising organic carbonate blocks alternating with arylate blocks, said arylate blocks comprising ester structural units derived from at least one 1,3-dihydroxybenzene moiety and at least one aromatic dicarboxylic acid, and having a degree of polymerization of at least about 4; and (iii) 5-60 wt. % of at least one rigid thermoplastic polymer comprising structural units derived from styrene and acrylonitrile; alpha-methylstyrene and acrylonitrile; alpha-methylstyrene, styrene, and acrylonitrile; styrene, acrylonitrile, and methyl methacrylate; alpha-methyl styrene, acrylonitrile, and methyl methacrylate; or alpha-methylstyrene, styrene, acrylonitrile, and methyl methacrylate, or mixtures thereof, wherein wt. % values are based on the weight of components (i)-(iii) and wherein a molded article made from the composition has a notched Izod impact strength of at least 5 kilojoules per square meter ($kJ/m^2$) as determined according to ISO 180 at room temperature and a Vicat B value of at least 101° C. determined at 120° C. according to ISO 306.

In still other embodiments the present invention comprises articles made from said compositions. Various other features, aspects, and advantages of the present invention will become more apparent with reference to the following description and appended claims.

DETAILED DESCRIPTION

In the following specification and the claims which follow, reference will be made to a number of terms which shall be defined to have the following meanings. The singular forms "a", "an" and "the" include plural referents unless the context clearly dictates otherwise. The terminology "monoethylenically unsaturated" means having a single site of ethylenic unsaturation per molecule. The terminology "polyethylenically unsaturated" means having two or more sites of ethylenic unsaturation per molecule. The terminology "(meth)acrylate" refers collectively to acrylate and methacrylate; for example, the term "(meth)acrylate monomers" refers collectively to acrylate monomers and methacrylate monomers. The term "(meth)acrylamide" refers collectively to acrylamides and methacrylamides.

The term "alkyl" as used in the various embodiments of the present invention is intended to designate linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. Alkyl groups may be saturated or unsaturated, and may comprise, for example, vinyl or allyl. The term "alkyl" also encompasses that alkyl portion of alkoxide groups. In various embodiments normal and branched alkyl radicals are those containing from 1 to about 32 carbon atoms, and include as illustrative non-limiting examples $C_1$-$C_{32}$ alkyl (optionally substituted with one or more groups selected from $C_1$-$C_{32}$ alkyl, $C_3$-$C_{15}$ cycloalkyl or aryl); and $C_3$-$C_{15}$ cycloalkyl optionally substituted with one or more groups selected from $C_1$-$C_{32}$ alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. The term "aryl" as used in the various embodiments of the present invention is intended to designate substituted or unsubstituted aryl radicals containing from 6 to 20 ring carbon atoms. Some illustrative non-limiting examples of these aryl radicals include $C_6$-$C_{20}$ aryl optionally substituted with one or more groups selected from $C_1$-$C_{32}$ alkyl, $C_3$-$C_{15}$ cycloalkyl, aryl, and functional groups comprising atoms selected from Groups 15, 16 and 17 of the Periodic Table. Some particular illustrative examples of aryl radicals comprise substituted or unsubstituted phenyl, biphenyl, tolyl, naphthyl and binaphthyl.

Compositions in embodiments of the present invention comprise a rubber modified thermoplastic resin comprising a discontinuous elastomeric phase dispersed in a rigid thermoplastic phase, wherein at least a portion of the rigid thermoplastic phase is grafted to the elastomeric phase. The rubber modified thermoplastic resin employs at least one rubber substrate for grafting. The rubber substrate comprises the discontinuous elastomeric phase of the composition. There is no particular limitation on the rubber substrate provided it is susceptible to grafting by at least a portion of a graftable monomer. In some embodiments suitable rubber substrates comprise dimethyl siloxane/butyl acrylate rubber, or silicone/butyl acrylate composite rubber; polyolefin rubbers such as ethylene-propylene rubber or ethylene-propylene-diene (EPDM) rubber; or silicone rubber polymers such as polymethylsiloxane rubber. The rubber substrate typically has a glass transition temperature, Tg, in one embodiment less than or equal to 25° C., in another embodiment below about 0° C., in another embodiment below about minus 20° C., and in still another embodiment below about minus 30° C. As referred to herein, the Tg of a polymer is the T value of polymer as measured by differential scanning calorimetry (DSC; heating rate 20° C./minute, with the Tg value being determined at the inflection point).

In one embodiment the rubber substrate is derived from polymerization by known methods of at least one monoethylenically unsaturated alkyl (meth)acrylate monomer selected from $(C_1-C_{12})$alkyl(meth)acrylate monomers and mixtures comprising at least one of said monomers. As used herein, the terminology "$(C_x-C_y)$", as applied to a particular unit, such as, for example, a chemical compound or a chemical substituent group, means having a carbon atom content of from "x" carbon atoms to "y" carbon atoms per such unit. For example, "$(C_1-C_{12})$alkyl" means a straight chain, branched or cyclic alkyl substituent group having from 1 to 12 carbon atoms per group. Suitable $(C_1-C_{12})$alkyl(meth)acrylate monomers include, but are not limited to, $(C_1-C_{12})$alkyl acrylate monomers, illustrative examples of which comprise ethyl acrylate, butyl acrylate, iso-pentyl acrylate, n-hexyl acrylate, and 2-ethyl hexyl acrylate; and their $(C_1-C_{12})$alkyl methacrylate analogs, illustrative examples of which comprise methyl methacrylate, ethyl methacrylate, propyl methacrylate, iso-propyl methacrylate, butyl methacrylate, hexyl methacrylate, and decyl methacrylate.

In various embodiments the rubber substrate may also optionally comprise a minor amount, for example up to about 5 wt. %, of structural units derived from at least one polyethylenically unsaturated monomer, for example those that are copolymerizable with a monomer used to prepare the rubber substrate. A polyethylenically unsaturated monomer is often employed to provide cross-linking of the rubber particles and/or to provide "graftlinking" sites in the rubber substrate for subsequent reaction with grafting monomers. Suitable polyethylenically unsaturated monomers include, but are not limited to, butylene diacrylate, divinyl benzene, butene diol dimethacrylate, trimethylolpropane tri(meth)acrylate, allyl methacrylate, diallyl methacrylate, diallyl maleate, diallyl fumarate, diallyl phthalate, triallyl methacrylate, triallyl cyanurate, triallyl isocyanurate, the acrylate of tricyclodecenylalcohol and mixtures comprising at least one of such monomers. In a particular embodiment the rubber substrate comprises structural units derived from triallyl cyanurate.

In some embodiments the rubber substrate may optionally comprise structural units derived from minor amounts of other unsaturated monomers, for example those that are copolymerizable with a monomer used to prepare the rubber substrate. In particular embodiments the rubber substrate may optionally include up to about 25 wt. % of structural units derived from one or more monomers selected from (meth) acrylate monomers, alkenyl aromatic monomers and monoethylenically unsaturated nitrile monomers. Suitable copolymerizable (meth)acrylate monomers include, but are not limited to, $C_1-C_{12}$ aryl or haloaryl substituted acrylate, $C_1-C_{12}$ aryl or haloaryl substituted methacrylate, or mixtures thereof; monoethylenically unsaturated carboxylic acids, such as, for example, acrylic acid, methacrylic acid and itaconic acid; glycidyl (meth)acrylate, hydroxy alkyl (meth) acrylate, hydroxy($C_1-C_{12}$)alkyl (meth)acrylate, such as, for example, hydroxyethyl methacrylate; $(C_4-C_{12})$cycloalkyl (meth)acrylate monomers, such as, for example, cyclohexyl methacrylate; (meth)acrylamide monomers, such as, for example, acrylamide, methacrylamide and N-substituted-acrylamide or N-substituted-methacrylamides; maleimide monomers, such as, for example, maleimide, N-alkyl maleimides, N-aryl maleimides, N-phenyl maleimide, and haloaryl substituted maleimides; maleic anhydride; methyl vinyl ether, ethyl vinyl ether, and vinyl esters, such as, for example, vinyl acetate and vinyl propionate. Suitable alkenyl aromatic monomers include, but are not limited to, vinyl aromatic monomers, such as, for example, styrene and substituted styrenes having one or more alkyl, alkoxy, hydroxy or halo substituent groups attached to the aromatic ring, including, but not limited to, alpha-methyl styrene, p-methyl styrene, 3,5-diethylstyrene, 4-n-propylstyrene, 4-isopropylstyrene, vinyl toluene, alpha-methyl vinyl toluene, vinyl xylene, trimethyl styrene, butyl styrene, t-butyl styrene, chlorostyrene, alpha-chlorostyrene, dichlorostyrene, tetrachlorostyrene, bromostyrene, alpha-bromostyrene, dibromostyrene, p-hydroxystyrene, p-acetoxystyrene, methoxystyrene and vinyl-substituted condensed aromatic ring structures, such as, for example, vinyl naphthalene, vinyl anthracene, as well as mixtures of vinyl aromatic monomers and monoethylenically unsaturated nitrile monomers such as, for example, acrylonitrile, ethacrylonitrile, methacrylonitrile, alpha-bromoacrylonitrile and alpha-chloro acrylonitrile. Substituted styrenes with mixtures of substituents on the aromatic ring are also suitable. As used herein, the term "monoethylenically unsaturated nitrile monomer" means an acyclic compound that includes a single nitrile group and a single site of ethylenic unsaturation per molecule and includes, but is not limited to, acrylonitrile, methacrylonitrile, alpha-chloro acrylonitrile, and the like.

In a particular embodiment the rubber substrate comprises repeating units derived from one or more $(C_1-C_{12})$alkyl acrylate monomers. In still another particular embodiment, the rubber substrate comprises from 40 to 95 wt. % repeating units derived from one or more $(C_1-C_{12})$alkyl acrylate monomers, and more particularly from one or more monomers selected from ethyl acrylate, butyl acrylate and n-hexyl acrylate. In a particular embodiment of the present invention the rubber substrate comprises structural units derived from n-butyl acrylate.

The rubber substrate may be present in the rubber modified thermoplastic resin in one embodiment at a level of from about 4 wt. % to about 94 wt. %; in another embodiment at a level of from about 10 wt. % to about 80 wt. %; in another embodiment at a level of from about 15 wt. % to about 80 wt. %; in another embodiment at a level of from about 35 wt. % to about 80 wt. %; in another embodiment at a level of from about 40 wt. % to about 80 wt. %; in another embodiment at a level of from about 25 wt. % to about 60 wt. %, and in still another embodiment at a level of from about 40 wt. % to about 50 wt. %, based on the weight of the rubber modified thermoplastic resin. In other embodiments the rubber substrate may be present in the rubber modified thermoplastic resin at a level of from about 5 wt. % to about 50 wt. %; at a level of from about 8 wt. % to about 40 wt. %; or at a level of from about 10 wt. % to about 30 wt. %, based on the weight of the particular rubber modified thermoplastic resin.

There is no particular limitation on the particle size distribution of the rubber substrate (sometimes referred to hereinafter as initial rubber substrate to distinguish it from the rubber substrate following grafting). In some embodiments the initial rubber substrate may possess a broad, essentially monomodal, particle size distribution with particles ranging in size from about 50 nanometers (nm) to about 1000 nm. In other embodiments the mean particle size of the initial rubber substrate may be less than about 100 nm. In still other embodiments the mean particle size of the initial rubber substrate may be in a range of between about 80 nm and about 400 nm. In other embodiments the mean particle size of the initial rubber substrate may be greater than about 400 nm. In still other embodiments the mean particle size of the initial rubber substrate may be in a range of between about 400 nm and about 750 nm. In still other embodiments the initial rubber substrate comprises particles which are a mixture of particle sizes with at least two mean particle size distributions. In a particular embodiment the initial rubber substrate comprises a mixture of particle sizes with each mean particle size distribution in a range of between about 80 nm and about 750 nm. In another particular embodiment the initial rubber substrate comprises a mixture of particle sizes, one with a mean particle size distribution in a range of between about 80 nm and about 400 nm; and one with a broad and essentially monomodal mean particle size distribution.

The rubber substrate may be made according to known methods, such as, but not limited to, a bulk, solution, or emulsion process. In one non-limiting embodiment the rubber substrate is made by aqueous emulsion polymerization in the presence of a free radical initiator, e.g., an azonitrile initiator, an organic peroxide initiator, a persulfate initiator or a redox initiator system, and, optionally, in the presence of a chain transfer agent, e.g., an alkyl mercaptan, to form particles of rubber substrate.

The rigid thermoplastic resin phase of the rubber modified thermoplastic resin comprises one or more thermoplastic polymers. In one embodiment of the present invention monomers are polymerized in the presence of the rubber substrate to thereby form a rigid thermoplastic phase, at least a portion of which is chemically grafted to the rubber substrate. The portion of the rigid thermoplastic phase chemically grafted to rubber substrate is sometimes referred to hereinafter as grafted copolymer. The rigid thermoplastic phase comprises a thermoplastic polymer or copolymer that exhibits a glass transition temperature (Tg) in one embodiment of greater than about 25° C., in another embodiment of greater than or equal to 90° C., and in still another embodiment of greater than or equal to 100° C.

In a particular embodiment the rigid thermoplastic phase comprises a polymer having structural units derived from one or more monomers selected from the group consisting of $(C_1-C_{12})$alkyl-(meth)acrylate monomers, aryl-(meth)acrylate monomers, alkenyl aromatic monomers and monoethylenically unsaturated nitrile monomers. Suitable $(C_1-C_{12})$alkyl-(meth)acrylate and aryl-(meth)acrylate monomers, alkenyl aromatic monomers and monoethylenically unsaturated nitrile monomers include those set forth hereinabove in the description of the rubber substrate. In addition, the rigid thermoplastic resin phase may, provided that the Tg limitation for the phase is satisfied, optionally include up to about 10 wt. % of third repeating units derived from one or more other copolymerizable monomers.

The rigid thermoplastic phase typically comprises one or more alkenyl aromatic polymers. Suitable alkenyl aromatic polymers comprise at least about 20 wt. % structural units derived from one or more alkenyl aromatic monomers. In one embodiment the rigid thermoplastic phase comprises an alkenyl aromatic polymer having structural units derived from one or more alkenyl aromatic monomers and from one or more monoethylenically unsaturated nitrile monomers. Examples of such alkenyl aromatic polymers include, but are not limited to, styrene/acrylonitrile copolymers, alpha-methylstyrene/acrylonitrile copolymers, or alpha-methylstyrene/styrene/acrylonitrile copolymers. In another particular embodiment the rigid thermoplastic phase comprises an alkenyl aromatic polymer having structural units derived from one or more alkenyl aromatic monomers; from one or more monoethylenically unsaturated nitrite monomers; and from one or more monomers selected from the group consisting of $(C_1-C_{12})$alkyl- and aryl-(meth)acrylate monomers. Examples of such alkenyl aromatic polymers include, but are not limited to, styrene/acrylonitrile/methyl methacrylate copolymers, alpha-methylstyrene/acrylonitrile/methyl methacrylate copolymers and alpha-methylstyrene/styrene/acrylonitrile/methyl methacrylate copolymers. Further examples of suitable alkenyl aromatic polymers comprise styrene/methyl methacrylate copolymers, styrene/maleic anhydride copolymers; styrene/acrylonitrile/maleic anhydride copolymers, and styrene/acrylonitrile/acrylic acid copolymers. These copolymers may be used for the rigid thermoplastic phase either individually or as mixtures.

When structural units comprising the rigid thermoplastic phase are derived from one or more monoethylenically unsaturated nitrite monomers, then the amount of nitrite monomer added to form the copolymer comprising the grafted copolymer and the ungrafted rigid thermoplastic phase may be in one embodiment in a range of between about 5 wt. % and about 40 wt. %, in another embodiment in a range of between about 5 wt. % and about 30 wt. %, in another embodiment in a range of between about 10 wt. % and about 30 wt. %, and in yet another embodiment in a range of between about 15 wt. % and about 30 wt. %, based on the total weight of monomers added to form the copolymer comprising the grafted copolymer and the ungrafted rigid thermoplastic phase.

When structural units comprising the rigid thermoplastic phase are derived from one or more $(C_1-C_{12})$alkyl- and aryl-(meth)acrylate monomers, then the amount of the said monomer added to form the copolymer comprising the grafted copolymer and the ungrafted rigid thermoplastic phase may be in one embodiment in a range of between about 5 wt. % and about 50 wt. %, in another embodiment in a range of between about 5 wt. % and about 45 wt. %, in another embodiment in a range of between about 10 wt. % and about 35 wt. %, and in yet another embodiment in a range of between about 15 wt. % and about 35 wt. %, based on the total weight of monomers added to form the copolymer comprising the grafted copolymer and the ungrafted rigid thermoplastic phase.

The amount of grafting that takes place between the rubber substrate and monomers comprising the rigid thermoplastic phase varies with the relative amount and composition of the rubber phase. In one embodiment, greater than about 10 wt. % of the rigid thermoplastic phase is chemically grafted to the rubber substrate, based on the total amount of rigid thermoplastic phase in the composition. In another embodiment, greater than about 15 wt. % of the rigid thermoplastic phase is chemically grafted to the rubber substrate, based on the total amount of rigid thermoplastic phase in the composition. In still another embodiment, greater than about 20 wt. % of the rigid thermoplastic phase is chemically grafted to the rubber substrate, based on the total amount of rigid thermoplastic phase in the composition. In particular embodiments the amount of rigid thermoplastic phase chemically grafted to the rubber substrate may be in a range of between about 5 wt. % and about 90 wt. %; between about 10 wt. % and about 90 wt. %; between about 15 wt. % and about 85 wt. %; between about 15 wt. % and about 50 wt. %; or between about 20 wt. % and about 50 wt. %, based on the total amount of rigid thermoplastic phase in the composition. In yet other embodiments, about 40 wt. % to 90 wt. % of the rigid thermoplastic phase is free, that is, non-grafted.

The rigid thermoplastic phase may be present in the rubber modified thermoplastic resin in one embodiment at a level of from about 85 wt. % to about 6 wt. %; in another embodiment at a level of from about 65 wt. % to about 6 wt. %; in another embodiment at a level of from about 60 wt. % to about 20 wt. %; in another embodiment at a level of from about 75 wt. % to about 40 wt. %, and in still another embodiment at a level of from about 60 wt. % to about 50 wt. %, based on the weight of the rubber modified thermoplastic resin. In other embodiments the rigid thermoplastic phase may be present in a range of between about 90 wt. % and about 30 wt. %, based on the weight of the rubber modified thermoplastic resin.

In one embodiment two or more different rubber substrates, each possessing a different mean particle size, may be separately employed in a polymerization reaction to prepare rigid thermoplastic phase, and then the products blended together to make the rubber modified thermoplastic resin. In illustrative embodiments wherein such products each possessing a different mean particle size of initial rubber substrate are blended together, then the ratios of said substrates may be in a range of about 90:10 to about 10:90, or in a range of about 80:20 to about 20:80, or in a range of about 75:25 to about 25:75, or in a range of about 70:30 to about 30:70. In some embodiments an initial rubber substrate with smaller particle size is the major component in such a blend containing more than one particle size of initial rubber substrate. In other embodiments wherein such products each possessing a different mean particle size of initial rubber substrate are blended together, an initial rubber substrate with smaller particle size is present in a range of about 85% to about 65% based on the total amount of rubber substrate employed.

The rigid thermoplastic phase may be made according to known processes, for example, mass polymerization, emulsion polymerization, suspension polymerization or combinations thereof, wherein at least a portion of the rigid thermoplastic phase is chemically bonded, i.e., "grafted" to the rubber phase via reaction with unsaturated sites present in the rubber phase. The grafting reaction may be performed in a batch, continuous or semi-continuous process. Representative procedures include, but are not limited to, those taught in U.S. Pat. No. 3,944,631. The unsaturated sites in the rubber phase are provided, for example, by residual unsaturated sites in those structural units of the rubber that were derived from a graftlinking monomer. In some embodiments of the present invention monomer grafting to rubber substrate with concomitant formation of rigid thermoplastic phase may optionally be performed in stages wherein at least one first monomer is grafted to rubber substrate followed by at least one second monomer different from said first monomer. Representative procedures for staged monomer grafting to rubber substrate include, but are not limited to, those taught in commonly assigned U.S. Pat. No. 7,049,368.

In a particular embodiment the rubber modified thermoplastic resin is an ASA graft copolymer such as that manufactured and sold by General Electric Company under the trademark GELOY®, and particularly an acrylate-modified ASA graft copolymer. ASA graft copolymers include, for example, those disclosed in U.S. Pat. No. 3,711,575. ASA graft copolymers also comprise those described in commonly assigned U.S. Pat. Nos. 4,731,414 and 4,831,079. In some embodiments of the invention where an acrylate-modified ASA is used, the ASA component further comprises an additional acrylate-graft formed from monomers selected from the group consisting of $C_1$ to $C_{12}$ alkyl- and aryl-(meth)acrylate as part of either the rigid phase, the rubber phase, or both. Such copolymers are referred to as acrylate-modified acrylonitrile-styrene-acrylate graft copolymers, or acrylate-modified ASA. A particular monomer is methyl methacrylate to result in a PMMA-modified ASA (sometimes referred to hereinafter as "MMA-ASA"). The rubber modified thermoplastic resin is present in compositions of the invention in an amount in one embodiment in a range of between about 5 wt. % and about 45 wt. %, in another embodiment in a range of between about 10 wt. % and about 45 wt. %, in another embodiment in a range of between about 15 wt. % and about 35 wt. %, in another embodiment in a range of between about 20 wt. % and about 35 wt. % and in another embodiment in a range of 19-33 wt. %, based on the weight of resinous components in the composition. In some other particular embodiments the rubber modified thermoplastic resin is present in compositions of the invention in an amount in a range of between about 30 wt. % and about 45 wt. %, based on the weight of resinous components in the composition.

Compositions in embodiments of the present invention comprise a separately synthesized rigid thermoplastic resinous component (referred to sometimes hereinafter as the "second thermoplastic resin") comprising structural units derived from a mixture of at least one alkenyl aromatic monomer and at least one monoethylenically unsaturated nitrile monomer. Suitable alkenyl aromatic monomers include, but are not limited to, vinyl aromatic monomers, such as, for example, styrene and substituted styrenes having one or more alkyl, alkoxy, hydroxy or halo substituent groups attached to the aromatic ring, including, but not limited to, alpha-methyl styrene, p-methyl styrene, 3,5-diethylstyrene, 4-n-propylstyrene, 4-isopropylstyrene, vinyl toluene, alpha-methyl vinyl toluene, vinyl xylene, trimethyl styrene, butyl styrene, t-butyl styrene, chlorostyrene, alpha-chlorostyrene, dichlorostyrene, tetrachlorostyrene, bromostyrene, alpha-bromostyrene, dibromostyrene, p-hydroxystyrene, p-acetoxystyrene, methoxystyrene and vinyl-substituted condensed aromatic ring structures, such as, for example, vinyl naphthalene, vinyl anthracene. Substituted styrenes with mixtures of substituents on the aromatic ring are also suitable. As used herein, the term "monoethylenically unsaturated nitrile monomer" means an acyclic compound that includes a single nitrile group and a single site of ethylenic unsaturation per molecule and includes, but is not limited to, acrylonitrile, methacrylonitrile, ethacrylonitrile, alpha-chloroacrylonitrile, alpha-bromoacrylonitrile, and the like. In some embodiments the separately synthesized rigid thermoplastic polymer comprises structural units essentially identical to those of the rigid thermoplastic phase comprising the rubber modified thermoplastic resin. In some particular embodiments the separately synthesized rigid thermoplastic polymer comprises structural units derived from styrene and acrylonitrile; alpha-methylstyrene and acrylonitrile; alpha-methylstyrene, styrene, and acrylonitrile; styrene, acrylonitrile, and methyl methacrylate; alpha-methyl styrene, acrylonitrile, and methyl methacrylate; or alpha-methylstyrene, styrene, acrylonitrile, and methyl methacrylate, or the like or mixtures thereof. The second thermoplastic resin is present in compositions of the invention in an amount in one embodiment in a range of between about 5 wt. % and about 60 wt. %, in another embodiment in a range of between about 5 wt. % and about 55 wt. %, in another embodiment in a range of between about 10 wt. % and about 55 wt. %, in another embodiment in a range of between about 15 wt. % and about 35 wt. %, in another embodiment in a range of between about 20 wt. % and about 35 wt. % and in another embodiment in a range of 19-33 wt. %, based on the weight of resinous components in the composition. In some particular embodiments the second thermoplastic resin is present in compositions of the invention in a range of between about 35 wt. % and about 55 wt. %, based on the weight of resinous components in the composition.

Compositions in embodiments of the present invention further comprise at least one polyestercarbonate which is a block polyestercarbonate comprising organic carbonate blocks alternating with arylate blocks comprising ester structural units. Suitable block polyestercarbonates comprise polymers comprising structural units of the formula (I):

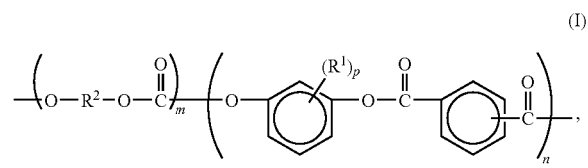
(I)

wherein each $R^1$ is independently halogen or $C_{1-12}$ alkyl, p is 0-3, each $R^2$ is independently a divalent organic radical, m is at least 1 and n is at least about 4. In some particular embodiments n is at least about 10, more particularly at least about 20 and still more particularly in a range of about 30-150. In other particular embodiments m is at least about 3, more particularly at least about 10 and still more particularly in a range of about 20-200. In still other particular embodiments m is between about 20 and 50. In some other particular embodiments the ratio m:n is in a range of 1:99 to 99:5. Within the context of the invention "alternating carbonate and arylate blocks" means that the polyestercarbonates comprise at least one carbonate block and at least one arylate block.

The arylate blocks comprise structural units derived from 1,3-dihydroxybenzene moieties (sometimes referred to herein after as "resorcinol") which may be unsubstituted or substituted. Alkyl substituents, if present, may be straight-chain or branched alkyl groups, and are most often located in the ortho position to both oxygen atoms although other ring locations are contemplated. Suitable $C_{1-12}$ alkyl groups include methyl, ethyl, n-propyl, isopropyl, butyl, iso-butyl, t-butyl, nonyl, decyl, and aryl-substituted alkyl, including benzyl. In one particular embodiment the alkyl group substituent, when present, is methyl. Suitable halogen substituents include bromo, chloro, and fluoro. 1,3-Dihydroxybenzene moieties comprising a mixture of alkyl and halogen substituents are also suitable. The value for p may be 0-3, particularly 0-2, and more particularly 0-1. In one embodiment the 1,3-dihydroxybenzene moiety is 2-methylresorcinol. In other embodiments the 1,3-dihydroxybenzene moiety is unsubstituted resorcinol in which p is zero. Polymers containing structural units derived from mixtures of 1,3-dihydroxybenzene moieties, such as a mixture of unsubstituted resorcinol with 2-methylresorcinol are also contemplated.

In the arylate structural units said 1,3-dihydroxybenzene moieties are bound to aromatic dicarboxylic acid moieties which may be monocyclic moieties, such as, but not limited to, isophthalate or terephthalate or their alkyl or halogen substituted derivatives; or polycyclic moieties, such as, but not limited to, biphenyl dicarboxylate, diphenylether dicarboxylate, diphenylsulfone dicarboxylate, diphenylketone dicarboxylate, diphenylsulfide dicarboxylate, or naphthalenedicarboxylate, and particularly naphthalene-2,6-dicarboxylate; or mixtures of monocyclic and/or polycyclic aromatic dicarboxylates. In particular embodiments the aromatic dicarboxylic acid moieties are isophthalate and/or terephthalate. Either or both of said moieties may be present. In many embodiments both are present in a molar ratio of isophthalate to terephthalate in the range of about 0.20-4.0:1. When the isophthalate to terephthalate ratio is greater than about 4.0:1, then unacceptable levels of cyclic oligomer may form. When the isophthalate to terephthalate ratio is less than about 0.25:1, then unacceptable levels of insoluble polymer may form. In particular embodiments the molar ratio of isophthalate to terephthalate is about 0.4-2.5:1, and more particularly about 0.67-1.5:1.

In the carbonate blocks, each $R^2$ is independently an organic radical derived from a dihydroxy compound. In particular embodiments at least about 60 percent of the total number of $R^2$ groups in the polymer are aromatic organic radicals and the balance thereof comprise aliphatic, alicyclic, or aromatic radicals, or mixtures thereof. Suitable $R^2$ radicals comprise m-phenylene, p-phenylene, 4,4'-biphenylene, 4,4'-bi(3,5-dimethyl)-phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438. Included among suitable dihydroxy-substituted aromatic hydrocarbons are the 2,2,2',2'-tetrahydro-1,1'-spirobi[1H-indene]diols having formula (II):

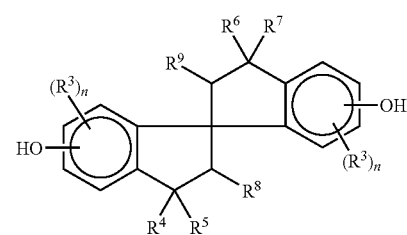
(II)

wherein each $R^3$ is independently selected from monovalent hydrocarbon radicals and halogen radicals; each $R^4$, $R^5$, $R^6$, and $R^7$ is independently $C_{1-6}$ alkyl; each $R^8$ and $R^9$ is independently H or $C_{1-6}$ alkyl; and each n is independently selected from positive integers having a value of from 0 to 3 inclusive. A preferred 2,2,2',2'-tetrahydro-1,1'-spirobi[1H-indene]-diol is 2,2,2',2'-tetrahydro-3,3,3,3'-tetramethyl-1,1'-spirobi[1H-indene]-6,6'-diol.

In other particular embodiments, each $R^2$ of formula (I) is an aromatic organic radical and still more particularly a radical of the formula (II):

$$-A^1-Y-A^2-, \quad (III)$$

wherein each $A^1$ and $A^2$ is a monocyclic divalent aryl radical and Y is a bridging radical in which one or two carbon atoms separate $A^1$ and $A^2$. The free valence bonds in formula (III) are usually in the meta or para positions of $A^1$ and $A^2$ in relation to Y. Compounds in which $R^2$ has formula (III) are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula (III), $A^1$ and $A^2$ typically represent unsubstituted phenylene or substituted derivatives thereof illustrative substituents (one or more) comprising alkyl, alkenyl, and halogen (particularly bromine). In a particular embodiment phenylene radicals are unsubstituted. In one embodiment both $A^1$ and $A^2$ are p-phenylene, although both may be o- or m-phenylene or one o- or m-phenylene and the other p-phenylene.

The bridging radical, Y, is one in which one or two atoms separate $A^1$ from $A^2$. In one embodiment one atom separates $A^1$ from $A^2$. Illustrative radicals of this type comprise —C=O, —O—, —S—, —SO— or —SO$_2$—, methylene, cyclohexylmethylene, 2-[2.2.1]-bicycloheptyl methylene, ethylene, isopropylidene, neopentylidene, cyclohexylidene, cyclopentadecylidene, cyclododecylidene, and adamantylidene. In some embodiments the bridging radical, Y, is a gem-alkylene radical. Also included, however, are unsaturated radicals. For reasons of availability and particular suitability for the purposes of this invention, a particular bisphenol is 2,2-bis(4-hydroxy-phenyl)propane (hereinafter referred to as bisphenol A or BPA), in which Y is isopropylidene and $A^1$ and $A^2$ are each p-phenylene.

In some embodiments $R^2$ in the carbonate blocks may consist of or at least partially comprise a radical derived from a 1,3-dihydroxybenzene moiety. Therefore, in one embodiment of the present invention the polyestercarbonates comprise carbonate blocks with $R^2$ radicals derived from a dihydroxy compound identical to at least one 1,3-dihydroxybenzene moiety in the polyarylate blocks. In another embodiment the polyestercarbonates comprise carbonate blocks with $R^2$ radicals derived from a dihydroxy compound different from any 1,3-dihydroxybenzene moiety in the polyarylate blocks. In yet another embodiment the polyestercarbonates comprise carbonate blocks containing a mixture of $R^2$ radicals derived from dihydroxy compounds at least one of which is the same as and at least one of which is different from any 1,3-dihydroxybenzene moiety in the polyarylate blocks. When a mixture of $R^2$ radicals derived from dihydroxy compounds is present, then the molar ratio of dihydroxy compounds identical to those present in the polyarylate blocks to those dihydroxy compounds different from those present in the polyarylate blocks is typically about 1:999 to 999:1. In some particular embodiments the polyestercarbonates comprise carbonate blocks containing a mixture of $R^2$ radicals derived from at least two of unsubstituted resorcinol, a substituted resorcinol, and bisphenol A.

Diblock, triblock, and multiblock polyestercarbonates are encompassed in the present invention. The chemical linkages between blocks comprising arylate chain members and blocks comprising organic carbonate chain members typically comprise a carbonate linkage between a diphenol residue of an arylate moiety and a —(C=O)—O— moiety of an organic carbonate moiety, although other types of linkages such as ester and/or anhydride are also possible. A representative carbonate linkage between said blocks is shown in formula (IV), wherein $R^1$ and p are as previously defined:

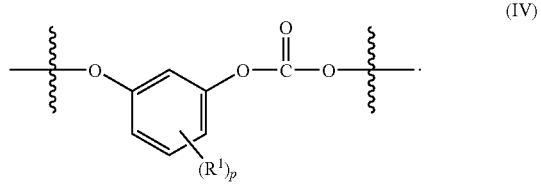

(IV)

In some embodiments the polyestercarbonates are substantially free of anhydride linkages. "Substantially free of anhydride linkages" means that the polyestercarbonate shows a decrease in molecular weight of less than 10% upon heating said polyestercarbonate at a temperature of about 280° C. to 290° C. for five minutes. In more particular embodiments, the polyestercarbonate shows a decrease of molecular weight of less than 5% upon heating said polyestercarbonate at a temperature of about 280° C. to 290° C. for five minutes.

In one embodiment the polyestercarbonate is substantially comprised of a diblock copolymer with a carbonate linkage between an arylate block and an organic carbonate block. In another embodiment the polyestercarbonate is substantially comprised of a triblock carbonate-ester-carbonate copolymer with carbonate linkages between the arylate block and organic carbonate end-blocks. Polyestercarbonates with at least one carbonate linkage between an arylate block and an organic carbonate block are typically prepared from 1,3-dihydroxybenzene arylate-containing oligomers containing at least one and preferably two hydroxy-terminal sites (hereinafter sometimes referred to as hydroxy-terminated polyester intermediate).

In another embodiment the polyestercarbonate comprises arylate blocks linked by carbonate linkages as shown in formula (V):

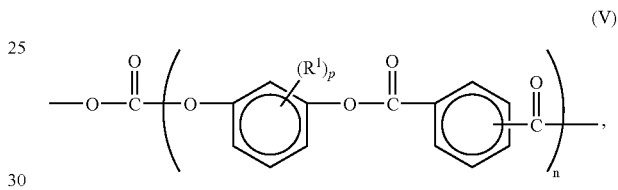

(V)

wherein $R^1$, p, and n are as previously defined, and the arylate structural units are as described for formula (I). Polyestercarbonates comprising formula (V) may arise from reaction of hydroxy-terminated polyester intermediate with a carbonate precursor in the substantial absence of any dihydroxy compound different from the hydroxy-terminated polyester intermediate.

In the polyestercarbonates in embodiments of the present invention the distribution of the blocks may be such as to provide a copolymer having any desired weight proportion of arylate blocks in relation to carbonate blocks. In some particular embodiments, the polyestercarbonates comprise about 10-99% by weight arylate blocks. In other particular embodiments, the polyestercarbonates comprise about 10-25% by weight arylate blocks. In other particular embodiments, the polyestercarbonates comprise at least 40% by weight arylate blocks. In yet other particular embodiments, the copolymers comprise about 45-60% by weight arylate blocks. In still other particular embodiments, the polyestercarbonates comprise at least 75% by weight arylate blocks. In still other particular embodiments, the polyestercarbonates comprise about 75-90% by weight arylate blocks. Mixtures of polyestercarbonates comprising different molecular weights and different ratios of arylate blocks to carbonate blocks may also be employed. Suitable polyestercarbonates may be prepared by methods known in the art including, but not limited to, those methods taught in U.S. Pat. Nos. 6,306,507, 6,559,270 and 6,583,256. Polyestercarbonates suitable for use in the invention may have different end-groups. In some embodiments end-groups arise from the use of a chain-stopper in the polyestercarbonate preparation. Illustrative chain-stoppers comprise at least one of mono-phenolic compounds, mono-carboxylic acid chlorides, and/or mono-chloroformates.

The polyestercarbonate is present in compositions of the invention in an amount in a range of between about 2 wt. % and about 82 wt. %. In some particular embodiments, the polyestercarbonate is present in compositions of the invention in an amount in one exemplary embodiment in a range of between about 2 wt. % and about 25 wt. %, in another exemplary embodiment in a range of between about 2 wt. % and about 21 wt. %, and in another exemplary embodiment in a range of between about 2 wt. % and about 9 wt. %, based on the weight of resinous components in the composition. In other particular embodiments, the polyestercarbonate is present in compositions of the invention in an amount in one exemplary embodiment in a range of between about 20 wt. % and about 80 wt. %, and in another exemplary embodiment in a range of between about 30 wt. % about 75 wt. % and in another exemplary embodiment in a range of 34-61 wt. %, based on the weight of resinous components in the composition. In other particular embodiments the polyestercarbonate is present in compositions of the invention in an amount in a range of between about 30 wt. % and about 60 wt. %, based on the weight of resinous components in the composition Compositions of the present invention may also optionally comprise additives known in the art including, but not limited to, stabilizers, such as flame retardants, color stabilizers, heat stabilizers, light stabilizers, antioxidants, UV screeners, and UV absorbers; lubricants, flow promoters and other processing aids; plasticizers, antistatic agents, mold release agents, impact modifiers, fillers, and colorants such as dyes and pigments which may be organic, inorganic or organometallic; and like additives. Illustrative additives include, but are not limited to, silicone oil, pentaerythritol tetrastearate, hindered amine light stabilizers, phosphite stabilizers, silica, silicates, zeolites, titanium dioxide, stone powder, glass fibers or spheres, carbon fibers, carbon black, graphite, calcium carbonate, talc, lithopone, zinc oxide, zirconium silicate, iron oxides, diatomaceous earth, calcium carbonate, magnesium oxide, chromic oxide, zirconium oxide, aluminum oxide, crushed quartz, clay, calcined clay, talc, kaolin, asbestos, cellulose, wood flour, cork, cotton and synthetic textile fibers, especially reinforcing fillers such as glass fibers, carbon fibers, metal fibers, and metal flakes, including, but not limited to aluminum flakes. Often more than one additive is included in compositions of the invention, and in some embodiments more than one additive of one type is included. In a particular embodiment a composition in an embodiment of the invention further comprises an additive selected from the group consisting of colorants, dyes, pigments, lubricants, stabilizers, heat stabilizers, light stabilizers, antioxidants, UV screeners, UV absorbers, fillers and mixtures thereof. In yet another particular embodiment a composition in an embodiment of the invention further comprises an additive selected from the group consisting of lubricants, stabilizers, antioxidants and mixtures thereof. In other particular embodiments compositions of the invention are free of a poly(alkylene dicarboxylate), such as, but not limited to, poly(butylene terephthalate).

Compositions of the invention and articles made therefrom may be prepared by known thermoplastic processing techniques. Known thermoplastic processing techniques which may be used include, but are not limited to, extrusion, calendering, kneading, profile extrusion, sheet extrusion, coextrusion, molding, extrusion blow molding, thermoforming, injection molding, co-injection molding and rotomolding. The invention further contemplates additional fabrication operations on said articles, such as, but not limited to, in-mold decoration, baking in a paint oven, surface etching, lamination, and/or thermoforming. Compositions of the invention may also comprise regrind or reworked resinous components.

In some embodiments of the present invention compositions may be suitable for use in applications that require high notched Izod impact strength (NII) values in molded articles. Articles molded from compositions in some embodiments of the invention exhibit NII values in one particular embodiment of greater than or equal to about 5 kilojoules per square meter ($kJ/m^2$), in another particular embodiment of greater than or equal to about 15 $kJ/m^2$, in another particular embodiment of greater than or equal to about 20 $kJ/m^2$, in still another particular embodiment of greater than or equal to about 25 $kJ/m^2$ and in still another particular embodiment of greater than or equal to about 30 $kJ/m^2$, as determined according to ISO 180 at room temperature. Compositions in other embodiments of the invention show no decrease of impact strength over a range of polyestercarbonate levels, in contrast to similar compositions containing comparable amounts of polycarbonate which show decrease in impact strength. In the present context decrease of impact strength over a range of polyestercarbonate levels means that the compositions show less than 10% decrease in notched Izod impact strength (NII) values determined according to ISO 180 at room temperature. In a particular embodiment compositions of the invention show less than 10% decrease in notched Izod impact strength over a range of 5-20 wt. % polyestercarbonate content, based on the weight of the entire composition. Polyestercarbonate-comprising compositions in still other embodiments of the invention may be suitable for use in applications that require higher impact strength but also comparable heat properties or higher heat properties than can be obtained in similar compositions comprising comparable amounts of polycarbonate.

Compositions in embodiments of the present invention can be formed into useful articles. In some embodiments useful articles comprise those which are employed in applications requiring good weatherability and impact strength, including but not limited to, articles which are prepared by an extrusion process or by an injection molding process. In other embodiments useful articles comprise those which are multilayer articles wherein at least one layer of the article comprises a composition of the invention. Illustrative examples of useful articles comprising a composition given in various embodiments of the invention comprise automotive, truck, agricultural vehicle, military vehicle, and motorcycle exterior and interior components, such as, but not limited to, panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings;

portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

In the following examples ASA was a copolymer comprising structural units derived from about 28-34 wt. % styrene, about 10-18 wt. % acrylonitrile, about 5-15 wt. % methyl methacrylate, and about 40-48 wt. % butyl acrylate. Polyestercarbonates (PEC) all comprised structural units derived from isophthalic and terephthalic acids present in a ratio in a range of about 40-60%, and resorcinol. PEC-1 was a block polyestercarbonate comprising ester structural units present in an amount in a range of about 10-25% and carbonate structural units present in an amount in a range of about 90-75% with a molecular weight in a range of about 22,000-32,000; PEC-2 was a block polyestercarbonate comprising ester structural units present in an amount in a range of about 75-90% and carbonate structural units present in an amount in a range of about 20-10% with a molecular weight in a range of about 18,000-24,000; and PEC-3 was a block polyestercarbonate comprising ester structural units present in an amount in a range of about 45-60% and carbonate structural units present in an amount in a range of about 55-40% with a molecular weight in a range of about 22,000-32,000; all determined according to polycarbonate standards. In comparative examples the polycarbonate (PC) employed was a bisphenol-A polycarbonate. MMASAN was copolymer comprising structural units derived from about 30-40% methyl methacrylate, about 35-45% styrene and about 20-30% acrylonitrile. AMSAN was a copolymer comprising structural units derived from about 60-75% alpha-methyl styrene and about 25-40% acrylonitrile. SAN was a copolymer comprising structural units derived from about 70-80% styrene and about 20-30% acrylonitrile.

Vicat B data at 120° C. were determined according to ISO 306. Weathering on test parts was performed according to the SAEJ1960 protocol on molded discs through 2500 kJ/m² exposure (measured at 340 nm). Melt volume rate (MVR) values was determined at 260° C. using a 5 kilogram weight according to ISO 1133. Notched Izod impact strength (NII) values were determined according to ISO 180 at room temperature. In the following examples the amounts of components are expressed in wt. % unless noted.

EXAMPLES 1-4 AND COMPARATIVE EXAMPLES 1-7

Compositions were compounded from the components shown in Table 1. Each composition contained in addition 2 parts per hundred parts resinous components (phr; wherein resinous components comprise polyestercarbonate, ASA, MMASAN, and AMSAN) of carbon black and 1.8 phr of a mixture of lubricants, stabilizers and antioxidants. Comparative examples (C.Ex.) were prepared with bisphenol A polycarbonate. The compounded material was molded into test parts and the parts were tested for notched Izod impact strength and Vicat B properties. The test results are shown in Table 1.

TABLE 1

| Component | C. Ex. 1 | C. Ex. 2 | C. Ex. 3 | C. Ex. 4 | C. Ex. 5 | Ex. 1 | Ex. 2 | Ex. 3 | Ex. 4 | C. Ex. 6 | C. Ex. 7 |
|---|---|---|---|---|---|---|---|---|---|---|---|
| ASA | 45.0 | 42.75 | 40.5 | 38.25 | 36.0 | 42.75 | 40.5 | 38.25 | 36.0 | — | — |
| PEC-1 | — | — | — | — | — | 5 | 10 | 15 | 20 | — | 100 |
| PC | — | 5 | 10 | 15 | 20 | — | — | — | — | 100 | — |
| MMASAN | 15 | 14.25 | 13.5 | 12.75 | 12 | 14.25 | 13.5 | 12.75 | 12 | — | — |
| AMSAN | 40 | 38 | 36 | 34 | 32 | 38 | 36 | 34 | 32 | — | — |
| NII (kJ/m²) | 5.9 | 5.0 | 4.7 | 4.4 | 4.4 | 5.2 | 5.4 | 5.6 | 5.8 | 15 | 12 |
| Vicat B, ° C. | 101.1 | 102.3 | 103.4 | 105.1 | 106.2 | 101.9 | 103.7 | 105.5 | 106.5 | — | — |

Compositions in embodiments of the invention comprising polyestercarbonate (Examples 1-4) surprisingly show good heat properties and also higher impact strength than comparative examples comprising polycarbonate. In particular, Example 2 comprising polyestercarbonate shows no reduction and even a slight increase in notched Izod impact strength in comparison to comparative example 3 comprising polycarbonate. The data in Table 1 show that the notched Izod impact strength of blends decreases upon the addition of increasing levels of polycarbonate but increases with the addition of increasing levels of polyestercarbonate. This is particularly unexpected since the notched Izod impact strength of polycarbonate is a higher measured value than that of polyestercarbonate.

The Vicat B heat values shown in Table 1 show that the addition of polycarbonate or polyestercarbonate to the ASA formulations has a comparable influence on the heat properties of the blends. This is also surprising since the glass transition temperature of polyestercarbonate is significantly lower than the glass transition temperature of polycarbonate (136° C. vs. 145° C., respectively). A person skilled in the art would therefore expect that the improvement in heat for polyestercarbonate would be less than with polycarbonate. In contrast, it is observed that the improvement in heat properties is about the same or slightly better than with polycarbonate, which is unexpected. The combination of increased impact strength and good heat properties makes these compositions comprising polyestercarbonate suitable for many commercial uses.

EXAMPLES 5-12 AND COMPARATIVE EXAMPLES 8-9

Compositions were compounded from the components shown in Table 2. Each composition contained in addition 2 phr of carbon black and 1.8 phr of a mixture of lubricants, stabilizers and antioxidants. The compounded material was molded into test parts and the parts were tested for notched Izod impact strength properties. The test results are shown in Table 2.

TABLE 2

| Component | C. Ex. 8 | C. Ex. 9 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|
| ASA | — | — | 42.75 | 40.5 | 38.25 | 36.0 | 42.75 | 40.5 | 38.25 | 36.0 |
| PEC-2 | 100 | — | 5 | 10 | 15 | 20 | — | — | — | — |
| PEC-3 | — | 100 | — | — | — | — | 5 | 10 | 15 | 20 |
| MMASAN | — | — | 14.25 | 13.5 | 12.75 | 12 | 14.25 | 13.5 | 12.75 | 12 |
| AMSAN | — | — | 38 | 36 | 34 | 32 | 38 | 36 | 34 | 32 |
| NII (kJ/m$^2$) | 9 | 9 | 5.0 | 5.1 | 5.3 | 5.2 | 5.3 | 5.7 | 5.6 | 5.9 |

The compositions of examples 5-12 show that there is an unexpected increase in impact strength in the compositions containing polyestercarbonate in comparison to the corresponding compositions of comparative examples 2-5 (Table 1) containing polycarbonate. In particular, the compositions of comparative examples 2-5 show a decrease in impact strength with increasing levels of polycarbonate while the compositions of examples 5-12 show an increase in impact strength with increasing levels of polyestercarbonate. Again, this is particularly unexpected since the notched Izod impact strength of polycarbonate (15 kJ/m$^2$) is a higher measured value than that of the polyestercarbonates PEC-1, PEC-2 and PEC-3.

EXAMPLES 13-22 AND COMPARATIVE EXAMPLE 8

Compositions were compounded from the components shown in Table 3. Each composition contained in addition 0.5 phr (wherein resinous components comprise polyestercarbonate, ASA and SAN) of carbon black, 0.5 phr of a mixture of lubricants, stabilizers and antioxidants 4 phr of an acrylic polymer comprising structural units derived from methyl methacrylate and at least one (C$_1$-C$_{12}$)alkyl acrylate monomer. The compounded material was molded into test parts and the parts were tested for notched Izod impact strength properties. The test results are shown in Table 3.

Unexpectedly, the results show that there is a sharp increase in NII value above about 20% PEC level but there is no decrease in weatherability (as measured by dE value) until much higher levels of PEC are reached. The balance between notched Izod impact and resistance to discoloration upon weathering is better in the range between 20 and 80% polyestercarbonate than could be expected. Flow properties (i.e. MVR values) decrease with increasing levels of polyestercarbonate, while Vicat B heat values beneficially increase with increasing levels of polyestercarbonate.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All patents and published articles cited herein are incorporated herein by reference.

The invention claimed is:

1. A weatherable resinous composition consisting essentially of (i) 19-45 wt. % of an acrylonitrile-styrene-acrylate (ASA) graft copolymer or an acrylate-modified (ASA) graft copolymer, (ii) 4-75 wt. % of at least one polyestercarbonate which is a block polyestercarbonate comprising organic carbonate blocks alternating with arylate blocks, said arylate blocks comprising ester structural units derived from at least one 1,3-dihydroxybenzene moiety and at least one aromatic dicarboxylic acid, and having a degree of polymerization of at least about 4; and (iii) 35-55 wt. % of at least one rigid thermoplastic polymer comprising structural units derived from styrene and acrylonitrile; alpha-methylstyrene and acrylonitrile; alpha-methylstyrene, styrene, and acrylonitrile; styrene, acrylonitrile, and methyl methacrylate; alpha-methyl styrene, acrylonitrile, and methyl methacrylate; or alpha-methylstyrene, styrene, acrylonitrile, and methyl methacrylate, or mixtures thereof.

2. The weatherable resinous composition of claim 1, wherein the carbonate blocks of the polyestercarbonate com-

TABLE 3

| Component | Ex. 13 | Ex. 14 | Ex. 15 | Ex. 16 | Ex. 17 | Ex. 18 | Ex. 19 | Ex. 20 | Ex. 21 | Ex. 22 | C. Ex. 8 |
|---|---|---|---|---|---|---|---|---|---|---|---|
| ASA | 40 | 35 | 32.5 | 30 | 27.5 | 25 | 22.5 | 20 | 15 | 10 | — |
| PEC-1 | 20 | 30 | 35 | 40 | 45 | 50 | 55 | 60 | 70 | 80 | 100 |
| SAN | 40 | 35 | 32.5 | 30 | 27.5 | 25 | 22.5 | 20 | 15 | 10 | — |
| NII (kJ/m$^2$) | 11.9 | 22.1 | 32.3 | 44.1 | 48.4 | 55.2 | 49 | 47.5 | 45.9 | 50 | 10.8 |
| Vicat B, ° C. | 101.1 | 105.0 | 105.8 | 107.6 | 109.7 | 111.4 | 113.8 | 117.1 | 125.0 | 131.7 | 139.4 |
| MVR cm$^3$/10 min. | 16.2 | 15.3 | 14.7 | 13.9 | 13.6 | 12.7 | 12.2 | 11.4 | 10.3 | 9.5 | 8 |
| dE after 2500 kJ | 2.81 | 1.95 | 2.05 | 2.09 | 1.91 | 2.70 | 3.93 | 3.90 | 5.32 | 6.44 | 9.44 | prise structural units derived from those selected from the group consisting of bisphenol A, unsubstituted resorcinol, and mixtures thereof.

3. The weatherable resinous composition of claim 1, wherein the carbonate blocks of the polyestercarbonate have a degree of polymerization of at least about 3.

4. The weatherable resinous composition of claim 1, wherein the arylate blocks of the polyestercarbonate comprise ester structural units derived from (A) at least one of unsubstituted resorcinol or a substituted resorcinol, and (B) isophthalic acid or terephthalic acid or a mixture of isophthalic acid and terephthalic acid.

5. The weatherable resinous composition of claim 4, wherein the arylate blocks of the polyestercarbonate comprise ester structural units derived from a mixture of isophthalic acid and terephthalic acid.

6. The weatherable resinous composition of claim 5, wherein the molar ratio of isophthalate to terephthalate in the ester structural units is in the range of about 0.25-4.0:1.

7. The weatherable resinous composition of claim 1, wherein the arylate blocks of the polyestercarbonate have a degree of polymerization of at least about 10.

8. The weatherable resinous composition of claim 1, wherein the polyestercarbonate comprises about 10-99% by weight of arylate blocks.

9. The weatherable resinous composition of claim 1, wherein a molded article made from the composition has a notched Izod impact strength of at least 20 kJ/m² as determined according to ISO 180 at room temperature.

10. The weatherable resinous composition of claim 1, which shows less than 10% decrease in notched Izod impact strength (NII) value as determined according to ISO 180 at room temperature over a range of 5-20 wt. % polyestercarbonate content, based on the weight of the entire composition.

11. An article made from the composition of claim 1.

12. A weatherable resinous composition consisting essentially of (i) 19-33 wt. % of an acrylonitrile-styrene-acrylate (ASA) graft copolymer or an acrylate-modified (ASA) graft copolymer, (ii) 34-61 wt. % of at least one polyestercarbonate which is a block polyestercarbonate comprising organic carbonate blocks alternating with arylate blocks, said arylate blocks comprising ester structural units derived from at least one 1,3-dihydroxybenzene moiety and at least one aromatic dicarboxylic acid, and having a degree of polymerization of at least about 4; (iii) 19-33 wt. % of at least one rigid thermoplastic polymer comprising structural units derived from styrene and acrylonitrile; alpha-methylstyrene and acrylonitrile; alpha-methylstyrene, styrene, and acrylonitrile; styrene, acrylonitrile, and methyl methacrylate; alpha-methyl styrene, acrylonitrile, and methyl methacrylate; or alpha-methylstyrene, styrene, acrylonitrile, and methyl methacrylate, or mixtures thereof, and wherein wt. % values are based on the weight of components (i)-(iii) and wherein a molded article made from the composition has a notched Izod impact strength of at least 30 kilojoules per square meter (kJ/m²) as determined according to ISO 180 at room temperature, a Vicat B value of at least 101° C. determined at 120° C. according to ISO 306, and a value for dE of less than or equal to about 4 after weathering of test parts performed according to the SAEJ1960 protocol through 2500 kJ/m² exposure (measured at 340 nm).

13. The weatherable resinous composition of claim 12, wherein the polyestercarbonate is present in an amount in a range of 39-56 wt. %.

14. The weatherable resinous composition of claim 12, wherein the polyestercarbonate is present in an amount in a range of 48-52 wt. %.

15. An article made from the composition of claim 12.

16. A weatherable resinous composition consisting of (i) 30-45 wt. % of an acrylonitrile-styrene-acrylate (ASA) graft copolymer or an acrylate-modified (ASA) graft copolymer, (ii) 4-25 wt. % of at least one polyestercarbonate which is a block polyestercarbonate comprising organic carbonate blocks alternating with arylate blocks, said arylate blocks comprising ester structural units derived from at least one 1,3-dihydroxybenzene moiety and at least one aromatic dicarboxylic acid, and having a degree of polymerization of at least about 4; (iii) 35-55 wt. % of at least one rigid thermoplastic polymer comprising structural units derived from styrene and acrylonitrile; alpha-methylstyrene and acrylonitrile; alpha-methylstyrene, styrene, and acrylonitrile; styrene, acrylonitrile, and methyl methacrylate; alpha-methyl styrene, acrylonitrile, and methyl methacrylate; or alpha-methylstyrene, styrene, acrylonitrile, and methyl methacrylate, or mixtures thereof, and wherein wt. % values are based on the weight of components (i)-(iii) and wherein a molded article made from the composition has a notched Izod impact strength of at least 5 kilojoules per square meter (kJ/m²) as determined according to ISO 180 at room temperature and a Vicat B value of at least 101° C. determined at 120° C. according to ISO 306.

* * * * *